United States Patent
Park et al.

(10) Patent No.: US 8,780,294 B2
(45) Date of Patent: Jul. 15, 2014

(54) DISPLAY DEVICE COMPRISING FIRST AND SECOND LIGHT GUIDE PLATES THAT RESPECTIVELY INCLUDE A PLURALITY OF FIRST AND SECOND RECESSED PATTERNS AND FLAT SURFACES DIRECTLY FACING EACH OTHER

(75) Inventors: Se Hong Park, Goyang-si (KR); Jae Seok Park, Daegu (KR); Kyung Ha Lee, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 320 days.

(21) Appl. No.: 12/879,549

(22) Filed: Sep. 10, 2010

(65) Prior Publication Data

US 2011/0063542 A1 Mar. 17, 2011

(30) Foreign Application Priority Data

Sep. 16, 2009 (KR) .................. 10-2009-0087442

(51) Int. Cl.
*G02F 1/1335* (2006.01)
*G09F 13/04* (2006.01)
*F21V 7/04* (2006.01)

(52) U.S. Cl.
USPC ...................... 349/62; 362/97.2; 362/616

(58) Field of Classification Search
USPC ............... 349/61, 62, 64; 362/97.1–97.4, 362/600–601, 606–607, 612–613, 615–617, 362/619, 621, 623, 625
See application file for complete search history.

(56) References Cited

U.S. PATENT DOCUMENTS

| 2005/0237749 A1 * | 10/2005 | Epstein et al. .............. 362/330 |
| 2007/0076434 A1 * | 4/2007 | Uehara et al. ............... 362/616 |
| 2007/0147088 A1 * | 6/2007 | Chien et al. ................ 362/616 |

* cited by examiner

*Primary Examiner* — Paul Lee
(74) *Attorney, Agent, or Firm* — Birch, Stewart, Kolasch & Birch, LLP

(57) ABSTRACT

A display device includes a liquid crystal display panel that varies a phase of polarized light via liquid crystal molecules, and having first and second polarizing plates respectively disposed on opposite sides of the liquid crystal display panel; a first light guide plate including a surface having a plurality of recessed patterns, to reflect light input through a side surface of the first light guide plate, and to output two-dimensional light towards the liquid crystal display panel; and a second light guide plate including a surface having a plurality of recessed patterns, the plurality of recessed patterns of the second guide plate facing the plurality of recessed patterns of the first light guide plate.

10 Claims, 11 Drawing Sheets

Fig. 4A (AN OBJECT POSITIONED AT THE REAR)

<A TRANSPARENT MODE>

Fig. 4B

<AN OPAQUE MODE>

DISPLAY DEVICE COMPRISING FIRST AND SECOND LIGHT GUIDE PLATES THAT RESPECTIVELY INCLUDE A PLURALITY OF FIRST AND SECOND RECESSED PATTERNS AND FLAT SURFACES DIRECTLY FACING EACH OTHER

CROSS-REFERENCE TO RELATED APPLICATION

This application claims priority under 35 U.S.C. 119 to Korean Patent Application No. 10-2009-0087442, filed on Sep. 16, 2009, the contents of which are hereby incorporated by reference.

BACKGROUND OF THE INVENTION

1. Field of the Invention

This disclosure relates to a display device, and more particularly to a transparent display device with a liquid crystal display (LCD) panel.

2. Discussion of the Related Art

Most recently, transparent display devices are actively being researched which allow not only an image to be displayed thereon but also allows objects at their rear side to be viewed. These transparent display devices can be ordinarily realized employing any one of an organic light emission panel and a plasma display panel which use self-generated light.

However, the transparent display devices cannot ordinarily be realized employing an LCD panel which does not self generate light and must use light applied from the rear side. This results from the fact that an opaque backlight assembly must be disposed at the rear side of the LCD panel and polarizing plates for controlling the penetration of light must be attached to the front and rear surfaces of the LCD panel. More specifically, the polarizing plates on the front and rear surface of the LCD panel allow light to pass through them when a liquid crystal material within the LCD panel is driven. On the contrary, when the liquid crystal material is not driven, the polarizing plates are in an opaque state. Due to this, it is impossible to implement the transparent display device using the LCD panel.

Nevertheless, transparent display devices can be applied to the front glasses of vehicles, household glasses, and so on, in order to provide desired information to users. Also, it is evident that the possibility of applying the transparent display device in a variety of fields will rapidly increase. Moreover, since the LCD panel provides a wide viewing-angle, a high brightness, a high contrast ratio, and a full color display, it is very necessary to develop a transparent display device with the LCD panel.

SUMMARY OF THE INVENTION

Accordingly, embodiments of the invention are directed to a transparent display device that substantially obviates one or more of problems due to the limitations and disadvantages of the related art.

An object of the invention is to provide a transparent display device that is adapted to selectively drive an LCD panel in transparent and opaque modes.

Additional features and advantages of the embodiments of the invention will be set forth in the description which follows, and in part will be apparent from the description, or may be learned by practice of the invention. The advantages of the embodiments will be realized and attained by the structure particularly pointed out in the written description and claims hereof as well as the appended drawings.

According to an embodiment of the invention, a display device includes a liquid crystal display panel that varies a phase of polarized light via liquid crystal molecules, and having first and second polarizing plates respectively disposed on opposite sides of the liquid crystal display panel; a first light guide plate including a surface having a plurality of recessed patterns, to reflect light input through a side surface of the first light guide plate, and to output two-dimensional light towards the liquid crystal display panel; and a second light guide plate including a surface having a plurality of recessed patterns, the plurality of recessed patterns of the second guide plate facing the plurality of recessed patterns of the first light guide plate.

According to another embodiment of the invention, a display device includes a liquid crystal display panel that varies a phase of polarized light via liquid crystal molecules; a first light guide plate including a surface having a plurality of recessed patterns, and a first polarizing plate disposed at an incident surface of the first light plate; a second light guide plate including a surface having a plurality of recessed patterns, the plurality of recessed patterns of the second guide plate facing the plurality of recessed patterns of the first light guide plate; and a second polarizing plate disposed on the liquid crystal display panel.

According to another embodiment of the invention, a display device includes a liquid crystal display panel that varies a phase of polarized light via liquid crystal molecules; a first light guide plate including a planar first surface, and a second surface having a plurality of recessed patterns; and a second light guide plate including a planar first surface, and a second surface having a plurality of recessed patterns, wherein amounts of light respectively emitted from the first and second surfaces of the first light guide plate are different, and amounts of light respectively emitted from the first and second surfaces of the second light guide plate are different.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE EMBODIMENTS

Reference will now be made in detail to the embodiments of the invention, examples of which are illustrated in the accompanying drawings. These embodiments introduced hereinafter are provided as examples in order to convey their spirits to the ordinary skilled person in the art. Therefore, these embodiments may be embodied in a different form, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Transparent display devices according to the example embodiments of the invention will now be explained in detail with reference to the attached drawings.

Figure 1:
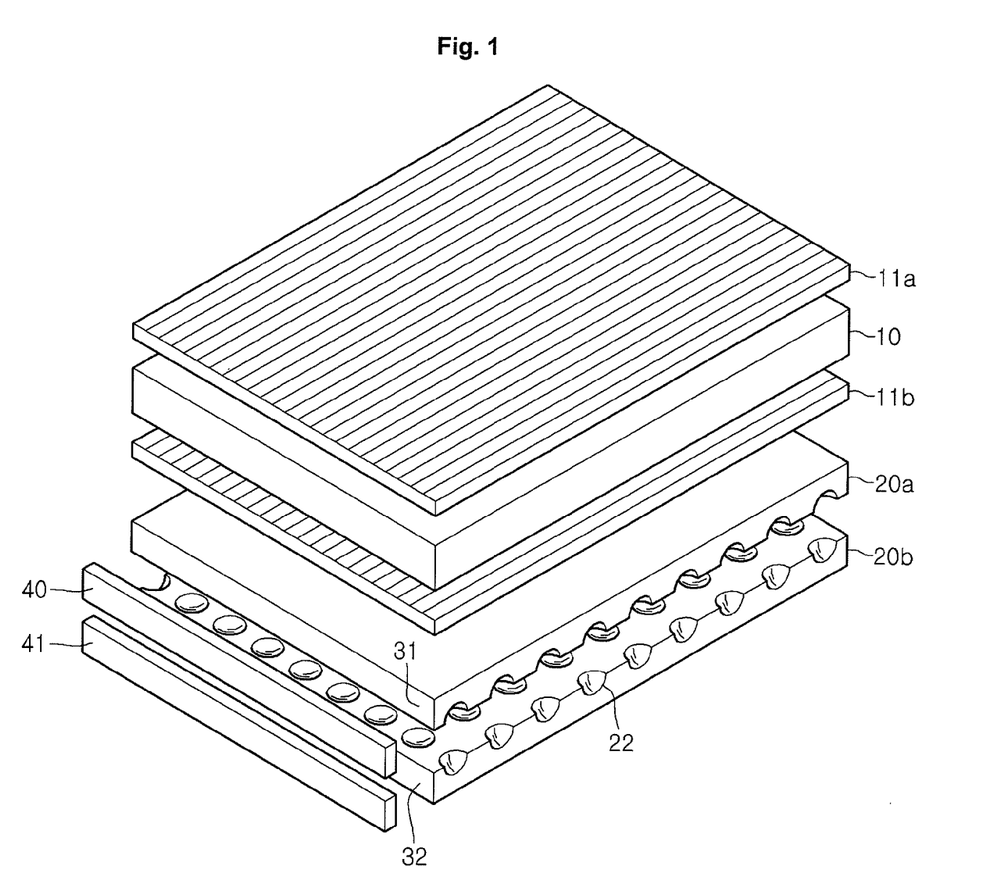
FIG. 1 is a perspective view showing a transparent display device according to a first embodiment of the invention.

FIG. 1 is a perspective view showing a transparent display device according to a first embodiment of the invention. As shown in FIG. 1, the transparent display device according to the first embodiment of the invention includes an LCD panel 10 configured to display images, and first and second light sources 40 and 41 each configured to emit light. The transparent display device further includes first and second light guide plates 20a and 20b each configured to derive two dimensional light from light which is generated in the respective one of the first and second light sources 40 and 41, and first and second polarizing plates 11a and 11b disposed above and under the LCD panel 10 and each configured to polarize light. Both the first and second light guide plates 20a and 20 are formed to have a cross-section of a planar shape.

The LCD panel 10 is configured with a thin film transistor (TFT) array substrate and a color filter substrate which are combined with a liquid crystal layer being between the TFT array and color filter substrates. The TFT array substrate includes a plurality of TFTs, pluralities of gate and data lines configured to cross each other and to define pixel regions, and a plurality of pixel electrodes arranged in the pixel regions. The color filter substrate includes a latticed black matrix used to shield light, and red, green and blue color filter layers formed between the black matrix.

The first and second light sources 40 and 41 are disposed to face first and second incident surfaces 31 and 32 of the first and second light guide plates 20a and 20b, respectively. Each of the first and second light sources 40 and 41 can include one of a lamp, such as a cold cathode fluorescent lamp (CCFL), an external electrode fluorescent lamp (EEFL), or others, and a light emission diode array. The light emission diode array can include either red, green, and blue light emission diodes or a plurality of white light emission diodes. Alternatively, the light emission diode array can include light emission diode packages each configured with red, green, and blue light emission diodes which are combined in a single package. The light emission diode array may also include a ultra-violet light emission diode. Such first and second light sources 40 and 41 emit visible light which includes first and second polarization components (for example, vertical and horizontal polarization components).

The first light guide plate 20a with the first incident surface 31 facing the first light source 40 is configured to include a plurality of recessed patterns 22 formed in its lower surface (the surface facing the second light guide plate 20b). The plurality of recessed patterns 22 enables light entered from the first light source 40 to be totally reflected, refracted, and scattered before converted into two-dimensional light progressing toward the upper surface of the first light guide plate 20a facing the LCD panel 10. In other words, the plurality of recessed patterns 22 functions to derive two-dimensional light from light generated in the first light source 40.

Such recessed patterns 22 can be formed by irradiating laser light on the lower surface of the first light guide plate 20a and the upper surface of the second light guide plate 20b using a separate mask with the same patterns as the recessed patterns. In this instance, the irradiating energy and period of laser light depend upon the specifications of a transparent display device, for example, the size and kind of the LCD panel 10. Alternatively, the recessed patterns 22 can be formed through any one among an etching process, a printing process, a prominence depressing process, and others. Also, the transparency and brightness of the transparent display device are varied along the size of the recessed pattern 22 and the distance between the recessed patterns 22. As such, in order to provide desired transparency and brightness, it is necessary to adjust the size of the recessed pattern 22 and the distance between the recessed patterns 22. In embodiments of the invention, the recessed patterns 22 may have various shapes, such as hemispherical, columnar, cone, and so on. Further, a mix of different shaped recessed patterns may be formed on the relevant surfaces of the first and second light guide plates 20a and 20b, for example.

Similarly, the second light guide plate 20b with the second incident surface 32 facing the second light source 41 is configured to include a plurality of recessed patterns 22 formed in its upper surface (the surface facing the first light guide plate 20a). The plurality of recessed patterns 22 enables light entered from the second light source 41 to be totally reflected, refracted, and scattered before being converted into two-dimensional light that progresses toward the lower surface of the second light guide plate 20b, i.e., in an opposite direction to the LCD panel 10. In other words, the plurality of recessed patterns 22 functions to derive two-dimensional light from light generated in the second light source 41.

However, each of the first and second light guide plates 20a and 20b allows about 30% of light to be output toward the surface where the recessed patterns 22 are formed. More specifically, about 70% of the converted two-dimensional light is output toward the surface not having the recessed patterns 22, and about 30% of the converted two-dimensional light is output toward the surface having the recessed patterns 22. The two-dimensional light output from each of the first and second light guide plates 20a and 20b is non-polarized light.

Although the plurality of recessed patterns 22 is formed in the upper surface of the second light guide plate 20b, the recessed patterns 22 can be formed in the lower surface of the second light guide plate 20b like those of the first light guide plate 20a. As shown in the embodiment of FIG. 1, the first and second light guide plates 20a and 20b can be disposed to allow the surfaces each provided with the recessed patterns 22 to face each other.

The transparent display device according to the invention can realize a transparent display, which projects objects at its rear side, using only the first light guide plate 20a, because of the lack of a reflective sheet. On the other hand, the transparent display device of the invention further using two-dimensional light derived by the second light guide plate 20b can realize a transparent display with an improved definition (a higher definition that that of the former instance).

More specifically, If light enters the second light guide plate 20b, 70% of two-dimensional light progresses in a downward direction of the second light guide plate 20b, but 30% of two-dimensional light progresses in a upward direction of the second light guide plate 20b. The downwardly progressing two-dimensional light is irradiated to objects which are positioned under the second light guide plate 20b. The upwardly progressing two-dimensional light is input to the LCD panel 10 via the upper surface of the second light guide plate 20b with the recessed patterns 22 in such manner as to have a phase difference with respect to two-dimensional light which is converted by the first light guide plate 20a. As such, the objects at the rear of the transparent display device can be more definitively viewed to a user.

In this transparent mode, two-dimensional light derived by the first light guide plate 20a is used for displaying an image on the LCD panel 10, two-dimensional light derived by the second light guide plate 20b is used for distorting a white light component of the image displayed on the LCD panel 10. Due to this, light reflected by the objects at the rear of the second light guide plate 20b is projected to the eyes of a user through the LCD panel 10. If an image including only black color components is displayed on the LCD panel 10, all of lights applied from the rear of the LCD panel 10 are thoroughly shielded by the first and second polarizing plates 11a and 11b. On the contrary, when an image with the brightness of above a fixed degree (or a fixed gray level) is displayed on the LCD panel 10, two-dimensional light derived by the first light guide plate 20a is transmitted through the LCD panel 10. Then, white light or high brightness light of the image is distorted by light derived by the second light guide plate 20b. As such, light reflected by the objects at the rear of the LCD panel 10 is transmitted through the LCD panel 10 and the first and second polarizing plates 11a and 11b.

In accordance therewith, the second light guide plate 20b can be used to control the LCD panel 10 to be driven in either a transparent mode (a first mode) or an opaque mode (a second mode). In embodiments of the invention, reference to a transparent mode indicates that light is separately provided to the second light guide plate 20b, while reference to an opaque mode indicates that light is not separately provided to the second light guide plate 20a. In embodiments of the invention, when the light is separately provided to the second light guide plate 20b, an observer looking at the LCD panel 10 is better able to see a scene or an object that is positioned at or beyond an opposite side of the LCD panel 10 with respect to the observer. Accordingly, there is an improvement in brightness, clarity, etc, of the scene or object relative to when the light is not separately provided to the second light guide plate 20b.

In detail, almost all incident light to the second light guide plate 20b is output in the form of two-dimensional light which progresses in the lower surface direction of the second light guide plate 20b, when the second light source 41 is turned-on (or activated). The downward progressing two-dimensional light is irradiated to objects positioned at the rear of the display device. On the other hand, the rest of the incident light corresponding to 30% is output in the form of two-dimensional light which progresses toward the upper surface of the second light guide plate 20b provided with the recessed patterns 22. Two-dimensional lights progressing from the first and second light guide plates 20a and 20b toward the LCD panel 10 have a fixed phase difference from each other due to a difference between their traveling distances. Also, two-dimensional light derived by the second light guide plate 20b distorts the white light components of an image while it passes through the second polarizing plate 11b, LCD panel 10 and first polarizing plate 11a. To this end, the light reflected by objects at the rear of the second light guide plate 20b can be transmitted through the second polarizing plate 11b, LCD panel 10 and first polarizing plate 11a. Therefore, the objects positioned at the rear of the second light guide plate 20b can be projected while images are displayed on the LCD panel 10. In other words, the LCD panel 10 is driven in the transparent mode. The second light source 41 is preferably configured to emit 1.3~1.5 times brighter light than that of the first light source 40.

On the contrary, when the second light source 41 is turned-off (or non-activated), the second light guide plate 20b can not provide independent light including the first and second polarization components. As such, the LCD panel 10 is driven in the opaque mode. In other words, the turned-off second light source 41 forces the LCD panel 10 to enter the opaque mode, so that an image is displayed on the LCD panel 10 by only two-dimensional light derived in the first light guide plate 40.

Figure 2A:
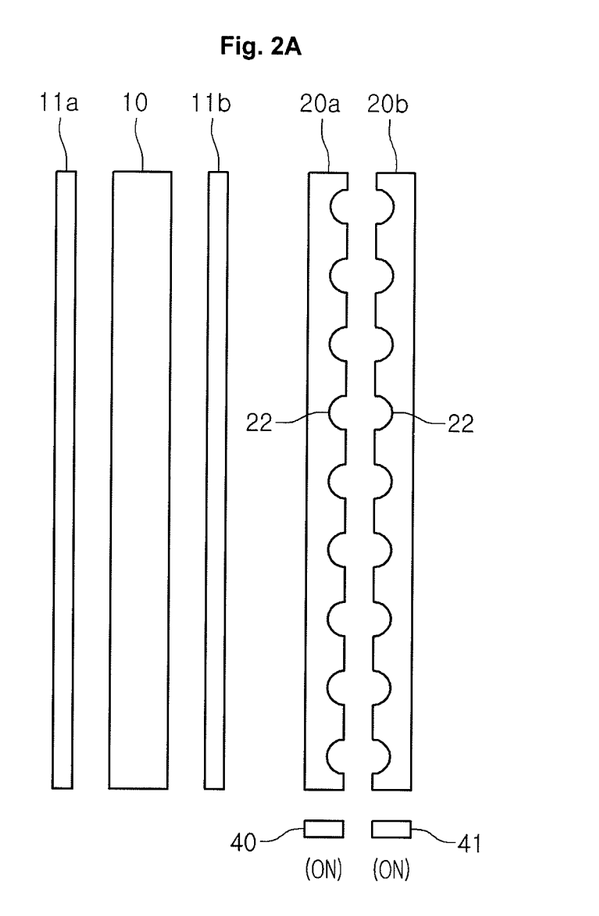
FIGS. 2A and 2B are cross-sectional views illustrating the transparent display device of FIG. 1 driven in transparent and opaque modes, respectively.
Figure 2B:
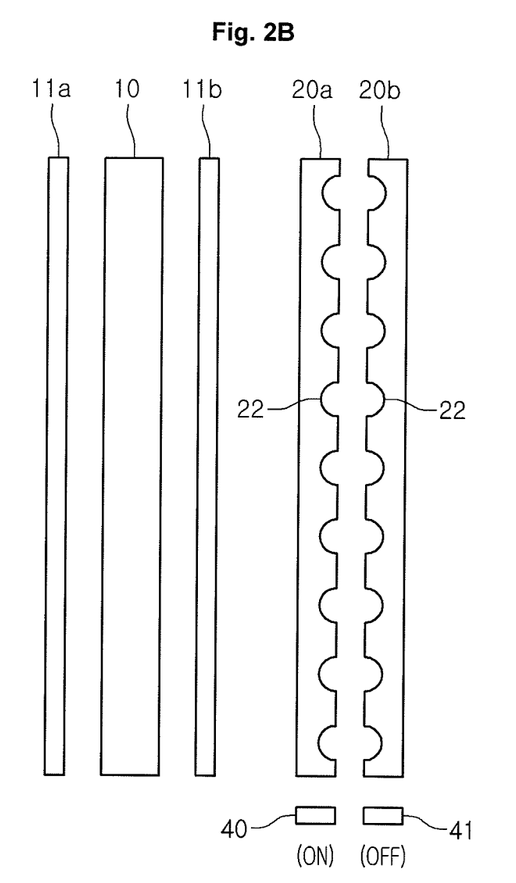
Figure 3:
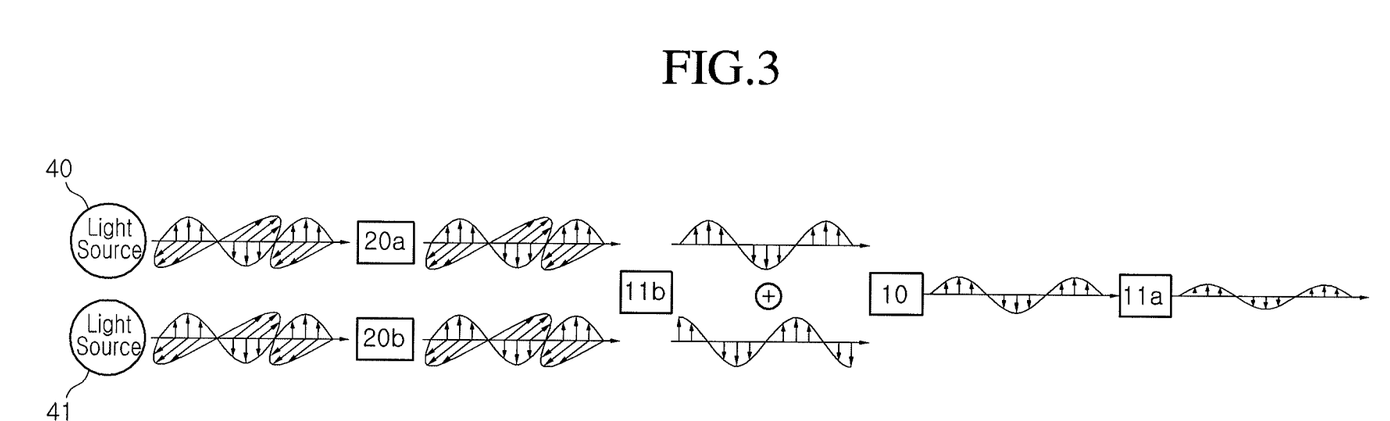
FIG. 3 is a waveform diagram sequentially illustrating lights from respective light sources being polarized in the transparent display device of FIG. 1.

FIGS. 2A and 2B are cross-sectional views illustrating the transparent display device of FIG. 1 driven in transparent and opaque modes, respectively. FIG. 3 is a waveform diagram sequentially illustrating lights from light sources being polarized in the transparent display device of FIG. 1. As shown in FIGS. 2A and 2B, the transparent display device of the first embodiment allows the LCD panel 10 to be driven in either a transparent display mode or an opaque display mode.

First, if the transparent display device of the first embodiment is driven in the transparent mode, the first and second light sources 40 and 41 disposed to face the incident surfaces of the first and second light guide plates 20a and 20b are in a turned-on state, as shown in FIG. 2A. The operation of the transparent display device in the transparent mode will be explained in detail with reference to FIGS. 2A and 3.

While the first light source 40 disposed to face the incident surface of the first light guide plate 20a is in the turned-on state, light progresses from the first light source 40 to the inner side of the first light guide plate 20a through the incident surface of the first light guide plate 20a. At this time, the light traveling within the first light guide plate 20a includes the first and second polarization components and is non-polarized light. The light with the first and second polarization components is entirely (totally) reflected (more specifically, are reflected, refracted, and scattered) by the recessed patterns 22 formed at the lower surface of the first light guide plate 20a and converted into two-dimensional light which progresses toward the LCD panel 10 disposed above the first light guide plate 20a.

Similarly, light entered from the turned-on second light source 41 into the second light guide plate 20b is entirely (or totally) reflected by the recessed patterns 22, which are formed at the upper surface of the second light guide plate 20b, and output in the form of two-dimensional light progressing toward the downward direction of the second light guide plate 20b. At this time, about ⅓ of the two-dimensional light converted by the recessed patterns 22 of the second light guide plate 20b is output toward the first light guide plate 20a. Faint two-dimensional-light output from the second light guide plate 20b is mixed with two-dimensional light derived in the first light guide plate 20a in a space between the second polarizing plate 11b and the first light guide plate 20a. Two-dimensional lights derived by the first and second light guide plates 20a and 20b have a fixed phase difference from each other due to a difference between their traveling paths (distances).

The mixed two-dimensional lights each having the first and second polarization components are polarized in the second polarizing plate 11b and then are transmitted through the LCD panel 10 and the first polarizing plate 11a. The transmitted two-dimensional light is used to form white image components of an image displayed on the LCD panel 10. This white light is basically configured with the two-dimensional light converted by the first light guide plate 20a. However, the white light further includes two-dimensional light converted by the second light guide plate 20b in the transparent mode. At this time, the white light is distorted by two-dimensional light derived in the second light guide plate 20b. The distortion of the white image components displayed on the LCD panel 10 allow non-polarized light components, which are reflected by the objects at the rear of the LCD panel 10, to be transmitted through the first and second polarizing plates 11a and 11b and LCD panel 10. Accordingly, the objects positioned at the rear of the LCD panel 10 can be viewed to the eyes of a user.

In this manner, two-dimensional light converted by the second light guide plate 20b is transferred to users through the LCD panel 10. As such, the objects positioned at the rear of the transparent display device can be viewed to the users. Two-dimensional lights progressing upwardly and downwardly from the second light guide plate 20b enable the objects at the rear of the transparent display device to be more definitively viewed to the users. In other words, the LCD panel 10 not only displays an image using two-dimensional light derived by the first light guide plate 20a under it, but also projects the objects positioned at the rear of the second light guide plate 20b using two-dimensional light derived by the second light guide plate 20b.

Secondly, when the transparent display device of the first embodiment is driven in the opaque mode, the second light source 41 disposed to face the incident surface of the second light guide plate 20b is in a turned-off state, as shown in FIG. 2B. Therefore, the LCD panel 10 can display an image using only two-dimensional light derived by the first light source 40 and the first light guide plate 20a. In this opaque mode, the transparent display device is driven in the same manner as the image display operation of an ordinary LCD device.

When the LCD panel 10 is driven in the transparent mode, the transparent display device has a light variation as shown in FIG. 3. As both the first and second light sources 40 and 41 are turned-on in the transparent mode, the first and second light sources 40 and 41 emit non-polarized light including the first and second polarization components. As such, two-dimensional light output from the upper surface of the first light guide plate 20a includes two kinds of non-polarized lights. However, the non-polarized two-dimensional lights have a fixed phase difference from each other because they are disposed at different positions from each other.

Non-polarized two-dimensional lights converted by the first light guide plates 20a and 20b are polarized and mixed with each other while passing through the second polarizing plate 11b. Also, the polarized and mixed two-dimensional lights interfere with each other. Such polarized and mixed two-dimensional lights enable white image components displayed on the LCD panel 10 to be distorted when they pass through the LCD panel 10 and first polarizing plate 11a. In accordance therewith, light reflected by the objects positioned at the rear of the second light guide plate 20b can be projected. In order to project more definitively the objects positioned at the rear of the display device, the second light source 41 included in the first embodiment is designed to emit 1.3~1.5 times brighter light than that of the first light source 40.

Figure 4A:
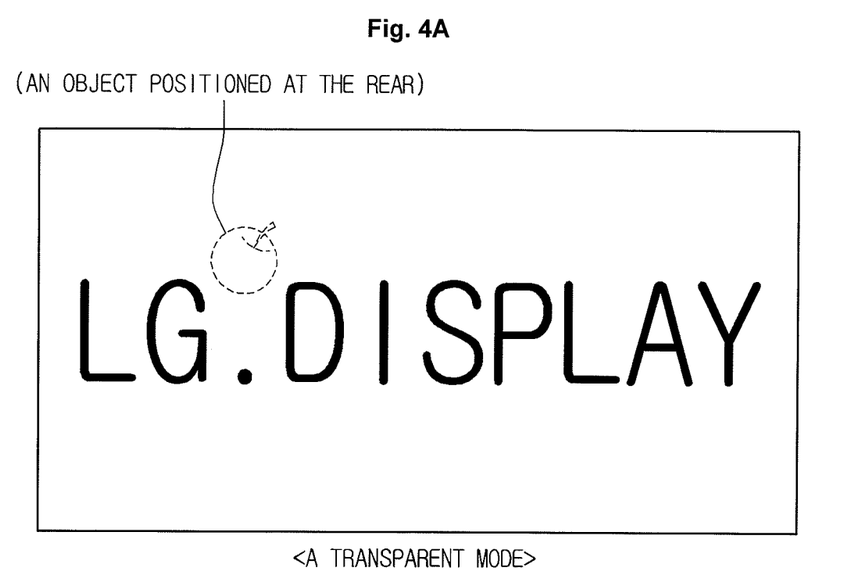
FIGS. 4A and 4B are views showing the transparent display device of FIG. 1 driven in the transparent and opaque modes, respectively.
Figure 4B:
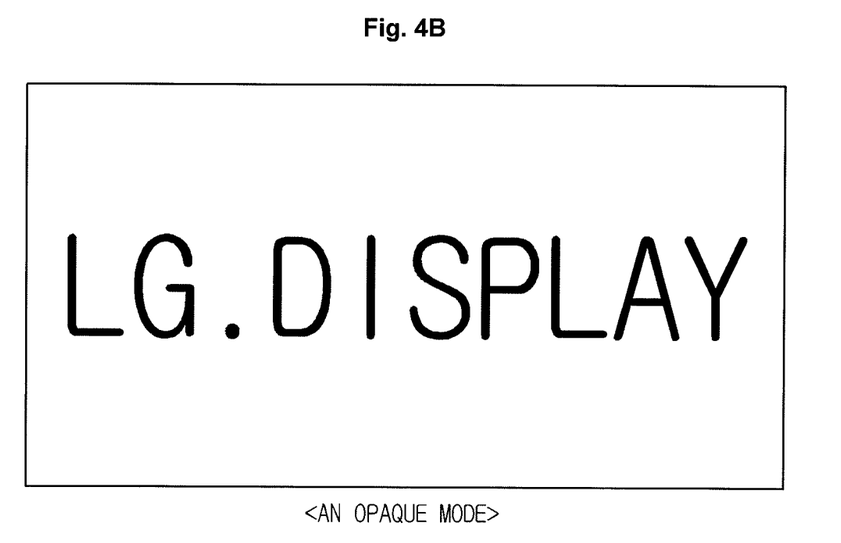

FIGS. 4A and 4B are views showing the transparent display device of FIG. 1 driven in the transparent and opaque modes, respectively.

Both the first and second light sources 40 and 41 are in the turned-on state in the transparent mode. In this instance, the objects positioned at the rear of the display device is viewed to users by light progressing from the second light guide plate 20b toward the LCD panel 10, as shown in FIG. 4A.

On the contrary, the second light source 41 is in the turned-off state and the first light source 40 is in the turned-on state, in the opaque mode. As such, two-dimensional light is not derived by the second light guide plate 20b. Therefore, the LCD panel 10 displays an image using only two-dimensional light converted in the first light guide plate 20a. In other words, the display device can display only an image without or weakly projecting the objects positioned at its rear side, as shown in FIG. 4B. As a result, the objects positioned at the rear of the display device are not viewed or less clearly viewed to the eyes of a user. More specifically, because the second light guide plate 20b is disposed under the first light guide plate 20a, the objects positioned at the rear of the display device are thoroughly or partially shielded in the opaque mode.

Figure 5:
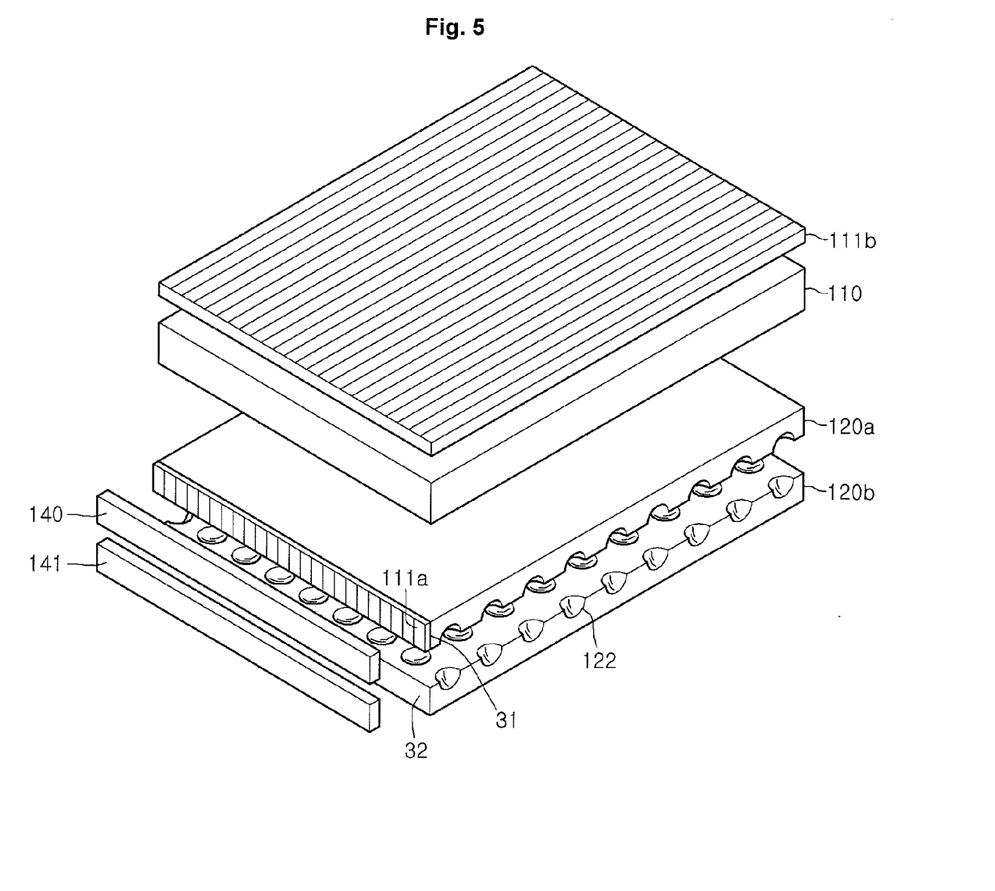
FIG. 5 is a perspective view showing of a transparent display device according to a second embodiment of the invention.

FIG. 5 is a perspective view showing a transparent display device according to a second embodiment of the invention.

Referring to FIG. 5, the transparent display device according to the second embodiment of the invention includes an LCD panel 110 configured to display images, and first and second light sources 140 and 141 each configured to emit light. The transparent display device further includes first and second light guide plates 120a and 120b each configured to derive two dimensional light from light which is generated in the respective one of the first and second light sources 140 and 141, a first polarizing plate 111a disposed on an incident surface 31 (first incident surface) of the first light guide plate 120a and configured to polarize light, and a second polarizing plate 111b disposed above the LCD panel 110 and configured to polarize light. The reference number of "32" indicates an incident surface (second incident surface) of the second light guide plate 120b.

The LCD panel 110 is configured with a TFT array substrate and a color filter substrate which are combined with a liquid crystal layer being between the TFT array and color filter substrates. The TFT array substrate includes a plurality of TFTs, pluralities of gate and data lines configured to cross each other and to define pixel regions, and a plurality of pixel electrodes arranged in the pixel regions. The color filter substrate includes a black matrix used to shield light, and red, green and blue color filter layers formed between the black matrix.

The first light source 140 is disposed to face the first polarizing plate 111a on the first incident surface 31 of the first light guide plate 120a. The second light source 141 is disposed to face the second incident surface 32 of the second light guide plate 120b. The first and second light sources 140 and 141 may be configured in the same manner as those described in the first embodiment of FIG. 1.

The first and second light guide plates 120a and 120b and the recessed patterns 122 are formed in the same structures as those described in the first embodiment. Also, the first and second light guide plates 120a and 120b and the recessed patterns 122 have the same functions as those described in the first embodiment. Therefore, the detailed description of the first and second light guide plates 122a and 122b and recessed patterns 122 will be omitted.

Figure 6A:
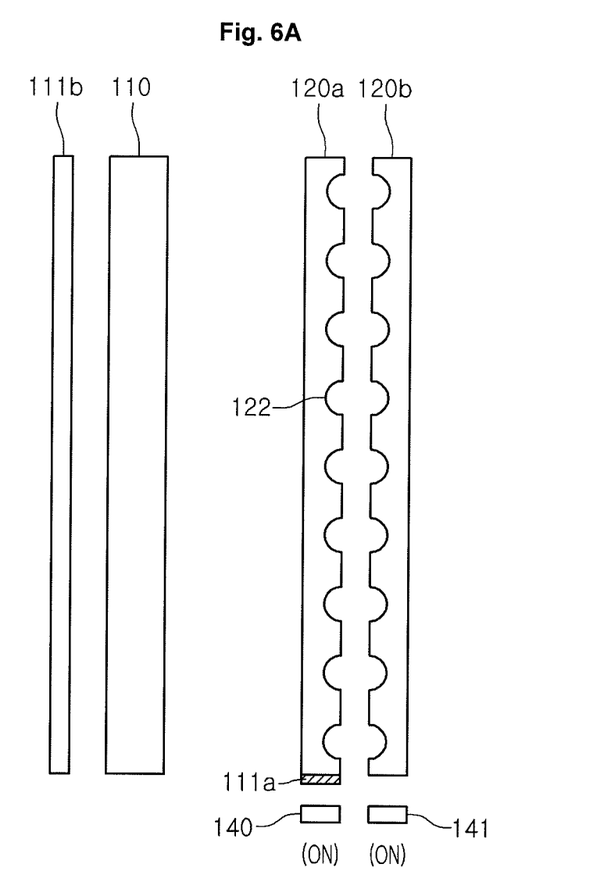
FIGS. 6A and 6B are cross-sectional views illustrating the transparent display device of FIG. 5 driven in transparent and opaque modes, respectively.
Figure 6B:
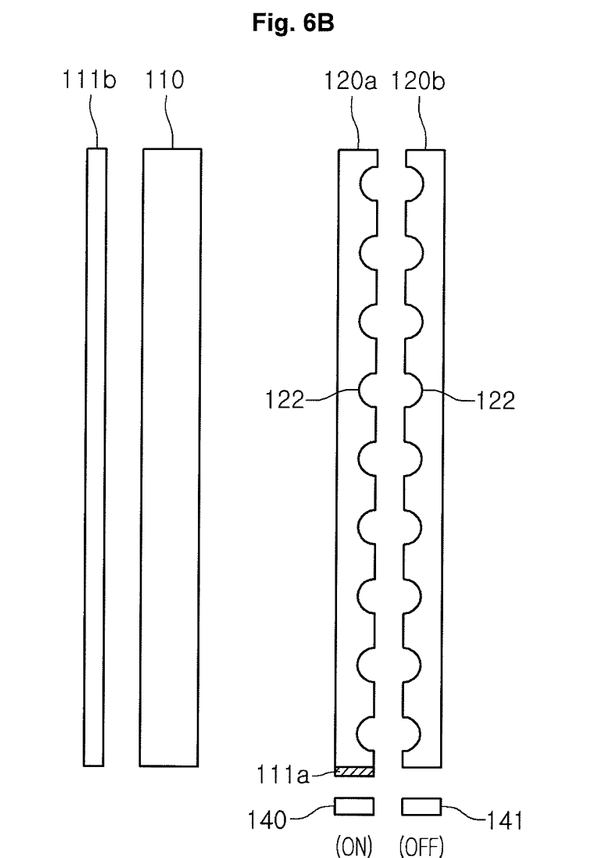
Figure 7:
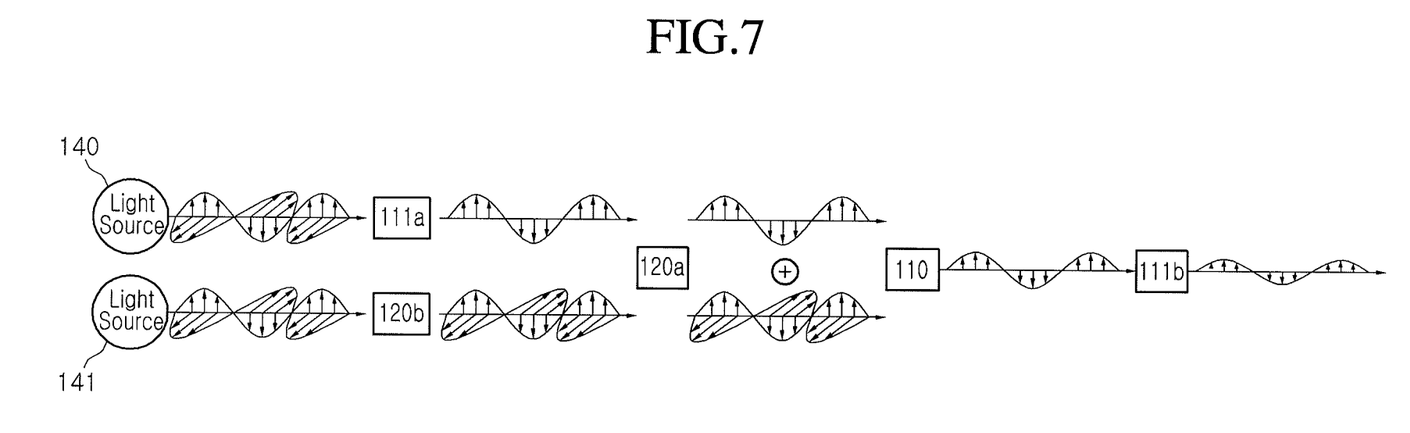
FIG. 7 is a waveform diagram sequentially illustrating lights from respective light sources being polarized in the transparent display device of FIG. 5.

FIGS. 6A and 6B are cross-sectional views illustrating the transparent display device of FIG. 5 driven in transparent and opaque modes, respectively. FIG. 7 is a waveform diagram sequentially illustrating lights from light sources being polarized in the transparent display device of FIG. 5. As shown in FIGS. 6A and 6B, the transparent display device of the second embodiment allows the LCD panel 110 to display an image in transparent and opaque modes.

First, if the transparent display device of the second embodiment is driven in the transparent mode, the second light sources 141 disposed to face the incident surface 32 of the second light guide plates 120b is in a turned-on state. Also, the first light source 140 disposed to face the first polarizing plate 111a on the incident surface 31 of the first light guide plate 120a is in the turned-on state. The operation of the transparent display device in the transparent mode will be explained in detail with reference to FIGS. 6A and 7.

As the first light source 140 disposed to face the first polarizing plate 111a on the incident surface 31 of the first light guide plate 120a is in the turned-on state, light including the first and second polarization components is emitted from the first light source 140 and polarized by the first polarizing plate 111a. The light emitted in the first light source 140 includes both the first and second polarization components, but the polarized light output from the first polarizing plate 111a includes only the first polarization component.

At the same time, light entered from the turned-on second light source 141 into the second light guide plate 120b is output in the form of non-polarized two-dimensional light which progresses in the downward direction of the second light guide plate 120b and toward the first light guide plate 120a. In this instance, the amount of two-dimensional light progressing toward the first light guide plate 120a corresponds to about ⅓ (i.e., 30%) of that of two dimensional light progressing in the downward direction of the second light guide plate 120b. In this instance, it is preferable, though not required, for the second light source 141 to emit light of the same brightness as light emitted from the first light source 140.

As such, two-dimensional light passing through the upper surface of the first light guide plate 120a includes two-dimensional light with only the first polarization component polarized by the first polarizing plate 111a and two-dimensional light with both the first and second polarization components converted in the second light guide plate 120b. Among two-dimensional lights, the polarized two-dimensional light converted by the first light guide plate 120a is used to display an image on the LCD panel 110. On the other hand, the non-polarized two-dimensional light of the first and second polarization components, which is converted by the second light guide plate 120b, is used to project the object positioned at the rear of the display device by interfering with the polarized two-dimensional light, which is converted by the first light guide plate 120a. Consequently, because the polarized and non-polarized two-dimensional lights interfere with each other when they are mixed with each other, it can be substantially realized the transparent mode which enables not only an image to be displayed on the LCD panel 110 but also objects positioned at the rear side of the display device to be projected.

When the transparent display device of the second embodiment is driven in the opaque mode, the second light source 141 is in the turned-off state. As such, the LCD panel 110 can display an image using only two-dimensional light of first polarization component which is derived by the first light source 140 and the first light guide plate 120a. Therefore, the objects positioned at the rear of the second light guide plate 120b are not displayed to users. In this opaque mode, the transparent display device is driven in the same manner as the image display operation of an ordinary LCD device.

Figure 8:
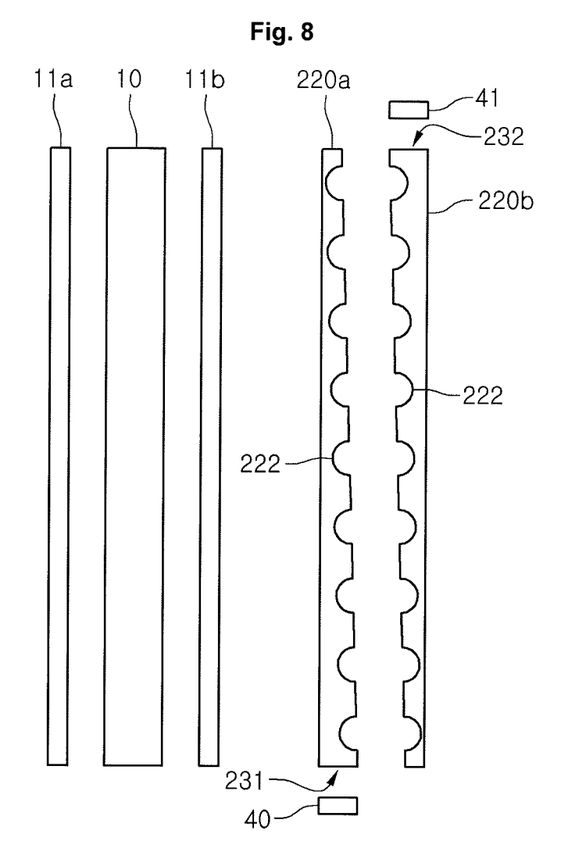
FIG. 8 is a cross-sectional view showing a transparent display device according to a third embodiment of the invention.
Figure 9:
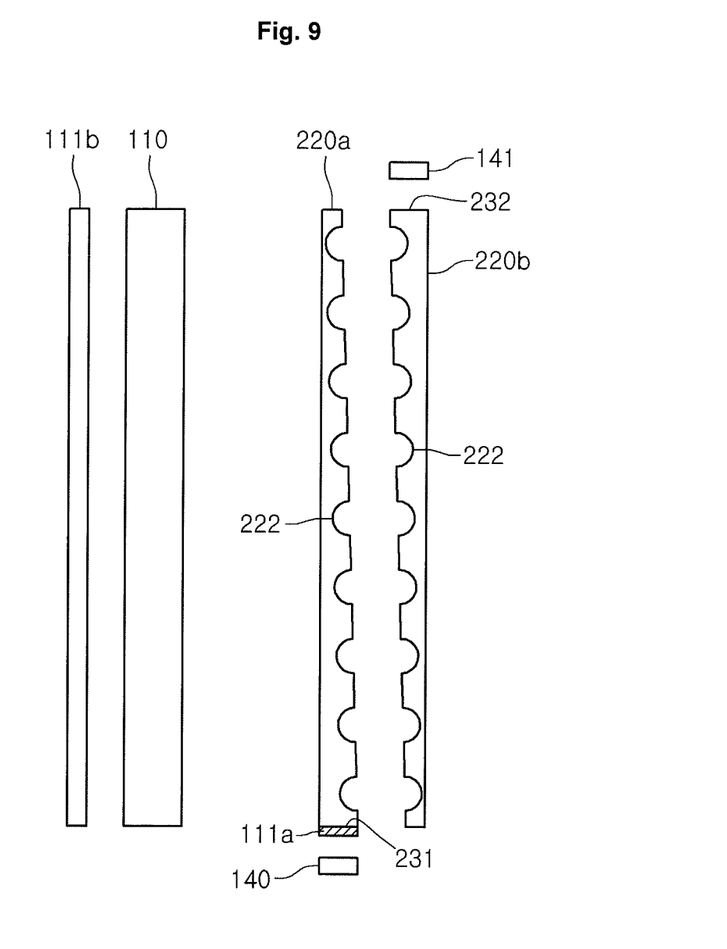
FIG. 9 is a cross-sectional view showing a transparent display device according to a fourth embodiment of the invention.

FIG. 8 is a cross-sectional view showing a transparent display device according to a third embodiment of the invention, and FIG. 9 is a cross-sectional view showing a transparent display device according to a fourth embodiment of the invention.

The transparent display device of the third embodiment shown in FIG. 8 has a structure modified from that of the first embodiment. The transparent display device of the third embodiment performs the same operation as that of the first embodiment in the transparent and opaque modes. Also, the transparent display device of the fourth embodiment shown in FIG. 9 has a structure modified from that of the second embodiment. The transparent display device of the fourth embodiment performs the same operation as that of the second embodiment in the transparent and opaque modes. Therefore, the descriptions of the third and fourth embodiments overlapping those of the first and second embodiments will be omitted.

Referring to FIG. 8, the transparent display device includes first and second polarizing plates 11a and 11b that are disposed to face an LCD panel 10 disposed in between the two polarizing plates 11a and 11b. The transparent display device further includes a first light guide plate 220a disposed under the second polarizing plate 11b and formed to have a cross-section of a wedge shape and a surface with recessed patterns 222, and a second light guide plate 220b formed to have a cross-section of the wedge shape and a surface with the recessed patterns 222 which faces the recessed pattern surface of the first light guide 220a. Furthermore, the transparent display device includes a first light source 40 disposed to face an incident surface (first incident surface) 231 of the first light guide plate 220a, and a second light source 41 disposed to face an incident surface (second incident surface) 232 of the second light guide plate 220b.

The first light guide plate 220a is configured to have an edge portion that includes the first incident surface 231 to have the thickest thickness. In detail, the first light guide plate 220a is formed to progressively have a thinner thickness further away from the first incident surface 231. Similarly, the second light guide plate 220b is configured to have an edge portion that includes the second incident surface 232 to have the thickest thickness. In other words, the second light guide plate 220b is formed to progressively have a thinner thickness further away from the second incident surface 232.

The pluralities of recessed patterns 222 are formed in a lower surface of the first light guide plate 220a and an upper surface of the second light guide plate 220b, respectively. The recessed patterns 222 formed in the first light guide plate 220a are arranged to face the recessed patterns 222 formed in the second light guide plate 220b.

Also, the first incident surface 231 of the first light guide plate 220a and the second incident surface 232 of the second light guide plate 220b are disposed at opposite directions to each other. In other words, the first and second incident surfaces 231 and 232 are disposed to face each other with respect to a middle portion of the bodies of the light guide plates 220*a* and 220*b*.

As such, the first and second light sources 40 and 41 are disposed to face each other in the center of the first and second light guide plates 220*a* and 220*b*. The second light source 41 is configured to emit 1.3~1.5 times brighter light than that emitted from the first light source 40, like the second light source 41 included in the transparent display device according to the first embodiment.

In this manner, the first and second light guide plates 220*a* and 220*b* are formed in the wedge shape. As such, the thickest portion of the first light guide plate 220*a* can be positioned to overlap the thinnest portion of the second light guide plate 220*b* and vice versa. Therefore, a slimed transparent display device can be implemented.

As shown in FIG. 9, the transparent display device of the fourth embodiment modified from that of the second embodiment, and includes an LCD panel 110, and first and second light guide plates 220*a* and 220*b* disposed under the LCD panel 110. The transparent display device further includes a first polarizing plate 111*a* attached to a first incident surface of the first light guide plate, and a second polarizing plate 111*b* disposed above the LCD panel 110.

The first and second light guide plate 220*a* and 220*b* are formed in the cross-sectional structures of a wedge shape. In detail, the thicknesses of the first and second light guide plates 220*a* and 220*b* progressively become thinner further away from the respective incident surfaces 231 and 232. Also, the first and second incident surfaces 231 and 232 of the first and second light guide plates 220*a* and 220*b* are disposed to face each other with respect to a middle portion of the bodies of the first and second light guide plates 220*a* and 220*b*, like the first and second incident surfaces 231 and 232 described in the transparent display of FIG. 8.

Furthermore, the transparent display device of the fourth embodiment includes first and second light sources 140 and 141 disposed to face the first and second incident surfaces of the first and second light guide plates 220*a* and 220*b*. The first and second light sources are disposed on the opposite sides to each other with respect to a middle portion of the light guide lights 220*a* and 220*b*, respectively.

Such a transparent display device according to the fourth embodiment is driven in the same manner as that of the second embodiment in the transparent and opaque modes. Therefore, the operations of the transparent display device according to the fourth embodiment will be omitted.

As described above, the transparent display devices according to the invention enable objects positioned at their rear sides to be selectively viewed or not viewed by users while images are displayed. As such, the transparent display devices according to the invention are implemented using an LCD panel which is normally not realized as a transparent display. Therefore, the applicable field of the LCD panel can be expanded. Furthermore, a variety of content images can be displayed using the LCD panel.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a liquid crystal display panel that varies a phase of polarized light via liquid crystal molecules, and having first and second polarizing plates respectively disposed on opposite sides of the liquid crystal display panel;
    a first light guide plate including an upper surface and a bottom surface, the bottom surface having a plurality of first recessed patterns and first flat surfaces disposed between the first recessed patterns, to reflect light input through a side surface of the first light guide plate, and to output two-dimensional light towards the liquid crystal display panel; and
    a second light guide plate including an upper surface and a bottom surface, the upper surface of the second light guide plate having a plurality of second recessed patterns and second flat surfaces disposed between the second recessed patterns, wherein the second recessed patterns of the second light guide plate are directly faced with the first recessed patterns of the first light guide plate to form a first empty space, and
    wherein the first flat surfaces of the first light guide plate are directly faced with the second flat surfaces of the second light guide plate to form a second empty space narrower than the first empty space.

2. The display device as claimed in claim 1, wherein the light input to the side surface of the first light guide plate is used to display an image on the liquid crystal display panel, and a light input to a side surface of the second light guide plate is used for a first mode of the liquid crystal display panel.

3. The display device as claimed in claim 1, wherein the liquid crystal display panel is driven in a first mode, when light input to a side surface of the second light guide plate progresses towards the first light guide plate through the surface of the second light guide plate having the plurality of recessed patterns.

4. The display device as claimed in claim 1, wherein a brightness of light input to a side surface of the second light guide plate is different from a brightness of the light input to the side surface of the first light guide plate.

5. The display device as claimed in claim 1, wherein the liquid crystal display panel is driven in a second mode when light is not input to a side surface of the second light guide plate.

6. The display device as claimed in claim 1, wherein both of the first and second light guide plates have one of a planar profile and a wedge profile.

7. The display device as claimed in claim 6, wherein both of the first and second light guide plates have a wedge profile, and an incident surface of the first light guide plate and an incident surface of the second light guide plate are disposed to face each other with respect to middle portions of the first and second light guide plates.

8. The display device as claimed in claim 6, wherein the both of the first and second light guide plates have the planar profile, and an incident surface of the first light guide plate and an incident surface of the second light guide plate are disposed together with respect to middle portions of the first and second light guide plates.

9. The display device as claimed in claim 1, further comprising a first light source disposed at a side of the first light guide plate and a second light source disposed at a side of the second light guide plate.

10. The display device as claimed in claim 9, wherein a brightness of the second light source is 1.3~1.5 times more than that of the first light source when the liquid crystal display panel is driven in a transparent mode.

* * * * *